United States Patent
Zhu et al.

(10) Patent No.: US 10,135,660 B1
(45) Date of Patent: Nov. 20, 2018

(54) SAMPLING FREQUENCY OFFSET TRACKING BASED ON DECISION FEEDBACK CHANNEL ESTIMATION

(71) Applicant: Hong Kong Applied Science and Technology Research Institute Company, Limited, Hong Kong (HK)

(72) Inventors: Zhixia Zhu, Hong Kong (HK); Kwok Kwan Tong, Hong Kong (HK); Wei Lun Alan Cheung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 16/005,881

(22) Filed: Jun. 12, 2018

(51) Int. Cl.
  *H04L 27/06* (2006.01)
  *H04L 27/26* (2006.01)
  *H04L 25/03* (2006.01)

(52) U.S. Cl.
  CPC .... *H04L 27/2655* (2013.01); *H04L 25/03057* (2013.01); *H04L 27/265* (2013.01)

(58) Field of Classification Search
  CPC ........... H04L 27/2655; H04L 25/03057; H04L 27/265
  See application file for complete search history.

(56) References Cited

U.S. PATENT DOCUMENTS

| 7,627,049 | B2 | 12/2009 | Kim |
| 7,693,036 | B2 | 4/2010 | Sun et al. |
| 8,442,134 | B2 | 5/2013 | Bury |
| 9,391,767 | B2 | 7/2016 | Hong et al. |
| 2006/0133527 | A1 | 6/2006 | Yu et al. |
| 2007/0025266 | A1 | 2/2007 | Riedel et al. |
| 2007/0127582 | A1* | 6/2007 | Lee ..................... H04L 25/0234 375/260 |
| 2008/0219144 | A1* | 9/2008 | Brehler ................ H04L 5/0048 370/203 |
| 2010/0272192 | A1 | 10/2010 | Varadarajan et al. |

FOREIGN PATENT DOCUMENTS

CN 107241289 A 10/2017

\* cited by examiner

*Primary Examiner* — Dhaval V Patel
(74) *Attorney, Agent, or Firm* — Stuart T. Auvinen; gPatent LLC

(57) ABSTRACT

A Sampling Frequency Offset (SFO) tracking and estimation circuit performs SFO compensation on incoming data. A SFO acquisition module makes an initial coarse estimate using a Network Time Base (NTB) from the Media-Access-Controller (MAC) layer, or from the physical layer using adjacent synchronization symbols. A preamble channel estimator compares a frequency-domain preamble symbol to a reference symbol to generate a first channel estimate. As additional symbols are received, converted to the frequency domain, demodulated, and error corrected, the resulting data are re-error-encoded and compared to the same symbol stored before error correction and demodulation to generate a decision feedback channel estimate. The conjugate of the decision feedback channel estimate is multiplied by the last channel estimate to generate a new SFO estimate that is scaled by a filter constant and used to adjust SFO compensation. Each symbol generates a new estimate without using pilots.

20 Claims, 9 Drawing Sheets

SAMPLING FREQUENCY OFFSET TRACKING BASED ON DECISION FEEDBACK CHANNEL ESTIMATION

FIELD OF THE INVENTION

This invention relates to communication systems, and more particularly for tracking sampling-frequency offset.

BACKGROUND OF THE INVENTION

Communication systems use a variety of methods to encode signals and increase bandwidth. Orthogonal Frequency Division Multiplexing (OFDM) is a form of signal modulation using a large number of parallel narrow-band subcarriers. However, OFDM is sensitive to sampling frequency offset.

FIG. 1 shows an OFDM waveform with no sampling frequency offset. Subcarriers 10 carry modulated symbols for the data being transmitted. Other signals 12 include background noise and harmonics but tend to cancel out, allowing subcarriers 10 to be detectable by a receiver.

Ideally, a receiver samples each of subcarriers 10 near the subcarrier's peak. For example, first subcarrier C1 is sampled by a receiver clock near its maximum, second subcarrier C2 is sampled near its maximum, third subcarrier C3 is sampled near its peak, and last subcarrier CN is sampled near its peak. An oscillator in the receiver causes the receiver data extraction circuitry to sample the received waveform periodically. The frequency of this receiver clock oscillator needs to be carefully adjusted so that sampling occurs near the peaks of subcarriers 10.

FIG. 2 shows an OFDM waveform with a sampling frequency offset. In this example, a small error in the receiver sampling-clock oscillator is present. The period of the receiver clock is elongated, causing the receiver sampling clock to be too slow. The first sampling edge of the receiver clock occurs near the peak of the first subcarrier C1, so a high signal S1 is detected for C1. However, a slight error in the sampling clock causes the next sampling edge to occur a little after the peak of second subcarrier C2. The signal S2 for carrier C2 is slightly lower than for C1.

The sampling errors are cumulative, so the error for the third sampling edge is greater. Third subcarrier C3 is sampled as the signal is falling, and its sampled signal strength S3 is less than S1 or S2. Similarly, sample points for subcarriers C4, C5, C6 are delayed further, causing sampling to occur farther and farther down from their peaks, at signal strengths S4, S5, S6.

At last sampling point 16 for subcarrier C7, that subcarrier's signal has fallen so far below its peak that the signal strength S7 is within the noise of other signals 12 and is no longer able to be read correctly. While the receiver clock was accurately synchronized to first subcarrier C1 at first sampling point 14, the slight errors accumulate for each successive subcarrier 10, causing increasing errors in sampling, until the last subcarrier is unreadable.

Sampling Frequency Offset (SFO) is caused by clock mismatch between the transmitter and the receiver. Clock mismatch always exists between two oscillators. When SFO exists, orthogonality is reduced and data errors increase. Sampling discrepancy grows with each carrier away from the first carrier. Even small levels of discrepancy cause the error rate to increase.

To overcome these drawbacks of SFO, Sampling Frequency Offset Estimation (SFOE) may be used for synchronization of an OFDM receiver. Most SFOE methods rely on a preamble and pilots. The preamble is located at the beginning of the frame that is used for synchronization. The preamble can be used in SFO estimation. Pilots are distributed within the payload. Pilots are commonly used for tracking residual frequency offsets.

FIG. 3 shows pilots in an OFDM frame. OFDM frame 20 includes data blocks 22 when data is transmitted, and pilots 24. Pilots 24 are staggered so that any subcarrier frequency (x-axis) has a pilot at that frequency once every 4 frequency slots. Pilots 24 contain a pattern that allows the receiver's sampling clock to be re-synchronized, allowing clock synchronization errors to be reset. While such pilots are useful, some communications standards do not use pilots.

Another approach is to use the cyclic prefix that precedes the OFDM symbols. These cyclic prefixes can be used for SFO estimation. However, the performance is limited by the cyclic prefix length and by channel reflections.

Some communication standard place extremely high requirements on SFO. For example, the HomePlug AV2 standard specifies high order modulation and long frame length, and a high sampling frequency. However, a preamble based SFOE cannot offer enough accuracy for the estimation. Moreover, there are no pilot symbols distributed in the payload for tracking the SFO when using HomePlug power line applications.

FIG. 4 shows a typical OFDM structure for the HomePlug AV2 standard. OFDM structure 30 starts with AV2 preamble 26, which is 10K in length. Preamble 26 has a fixed pattern of high and low signals that does not occur in data payloads.

The first symbol, AV2 Frame Control (FC) symbol 35, is preceded by Guard Interval (GI) 31. Each symbol 35, 36, 37, 38, is preceded by a Guard Interval 31, 33, 34 that ensures that symbols do not interfere with other symbols. Overlapping transmission is prevented by the guard intervals. Echoes from the previous symbol may fall within the guard interval and still not interfere with the subsequent symbol.

Frame control symbol 35 provides frame control information, such as the number and length of subsequent symbols 36, 37, 38. Frame control symbol 35 may contain information about the physical block size, number of symbols, tone map information, mapping type, FEC rate, etc.

Symbols 36, 37, 38 are data symbols that carry the data payload. These symbols can be 8192 multi-bit samples long, while Guard Intervals 32, 33, 34 are 1512 samples long. Many more symbols than shown are typically present, each with its own guard interval.

Although the HomePlug AV2 standard provides OFDM structure 30 with Guard Intervals 31, 33, 34 and frame control symbol 35, there are no pilots. Symbols 36, 37, 38 carry data but no pilots. Thus Sampling Frequency Offset (SFO) techniques that use pilots cannot be used with the HomePlug AV2 standard.

What is desired is a method establishing a feedback loop for tracking sampling frequency offset for an OFDM receiver. A SFO compensation circuit that increases the efficiency and accuracy of the SFO is desirable. A SFOE circuit for communication standards that do not have pilots is desired. A SFOE circuit for the HomePlug AV2 standard is desired.

DETAILED DESCRIPTION

The present invention relates to an improvement in Sampling Frequency Offset Estimation (SFOE) circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
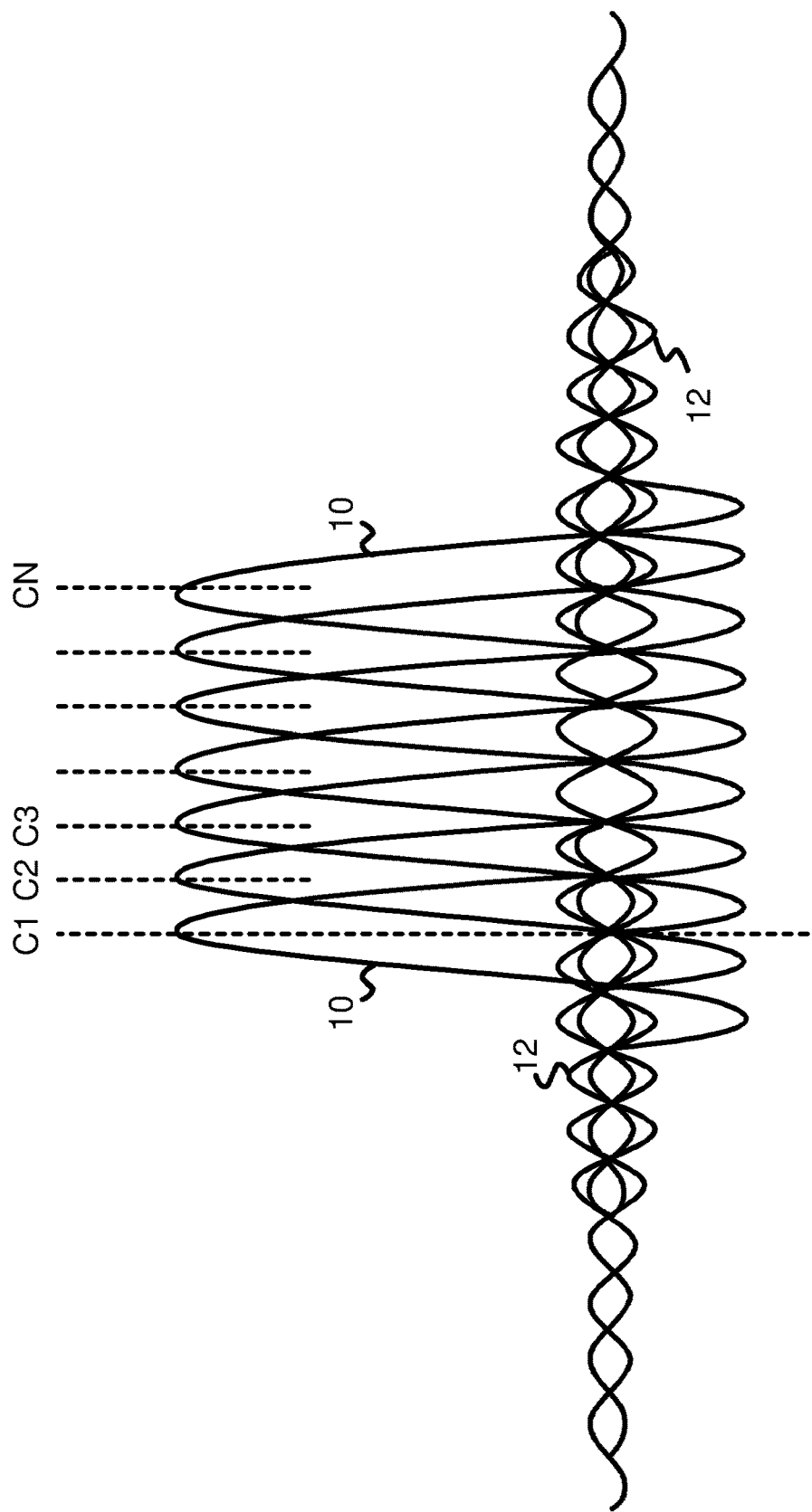
FIG. 1 shows an OFDM waveform with no sampling frequency offset.
Figure 2:
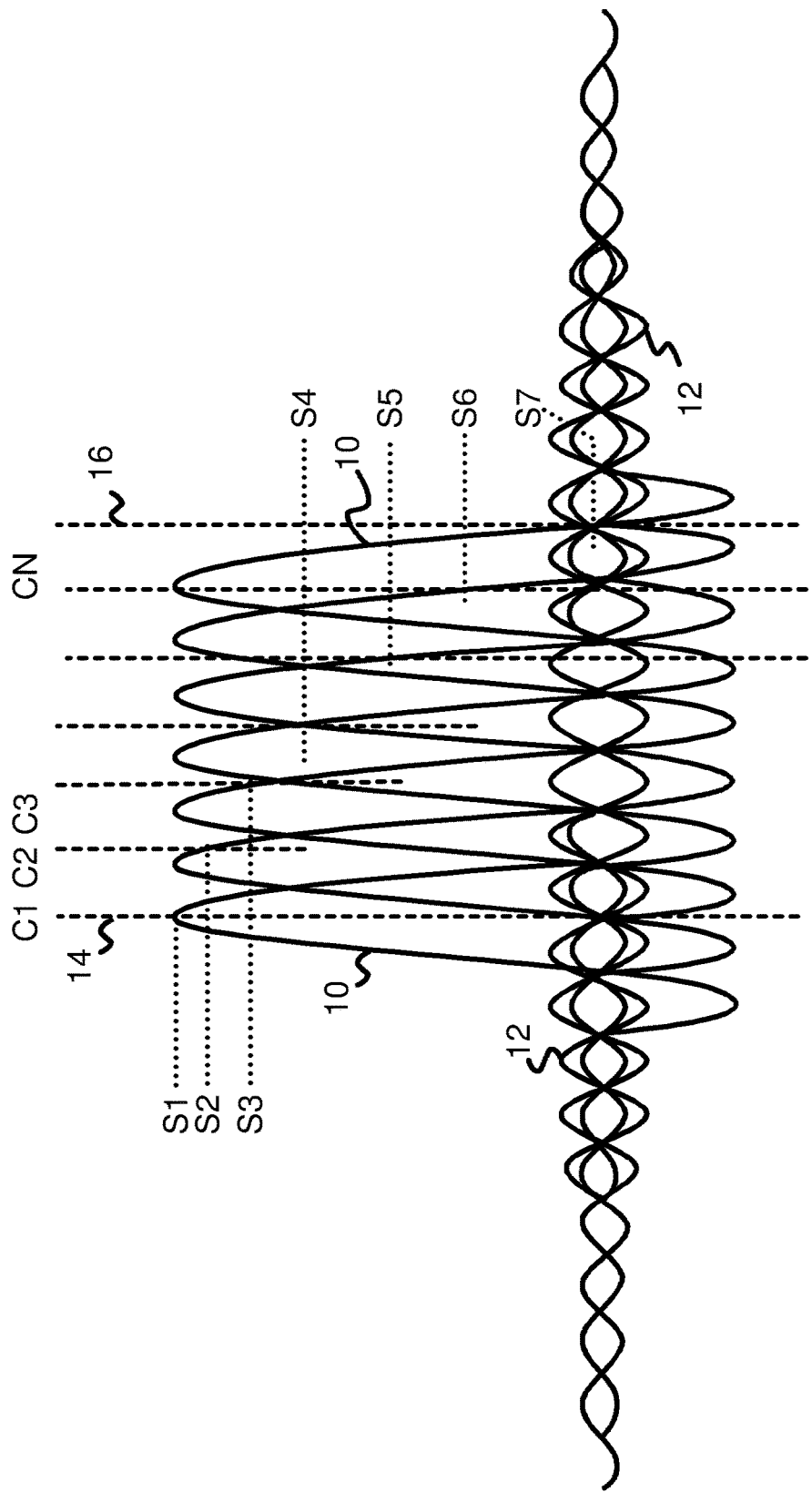
FIG. 2 shows an OFDM waveform with a sampling frequency offset.
Figure 3:
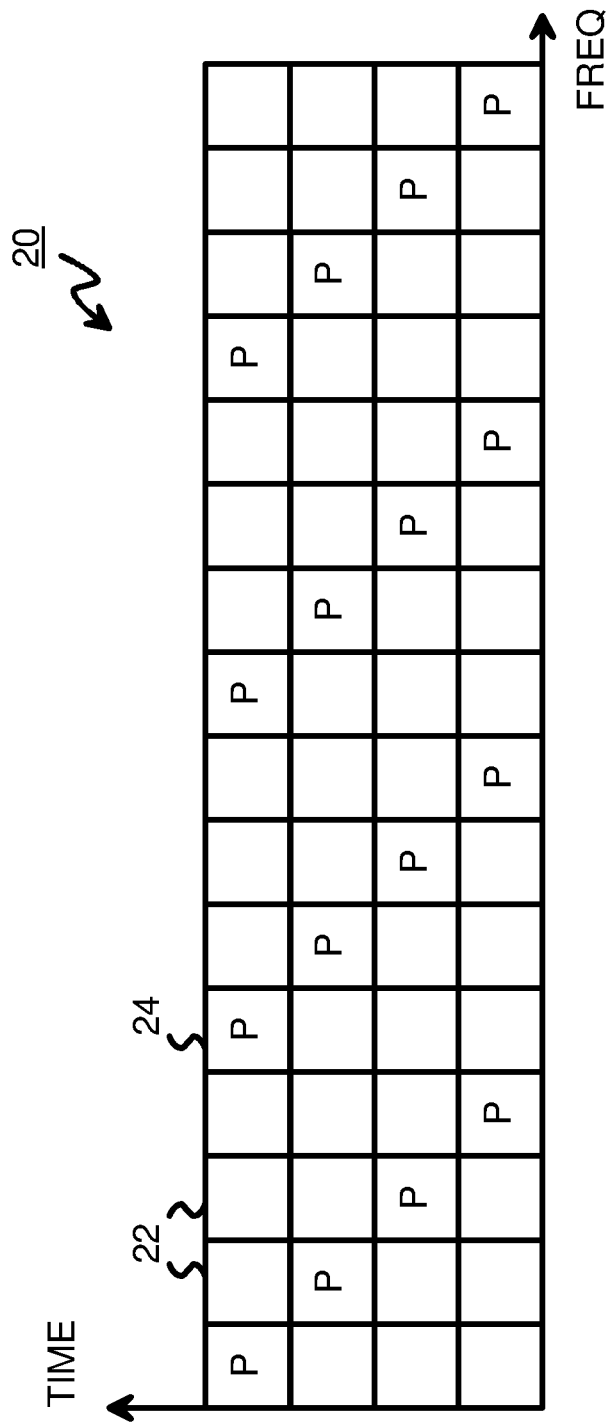
FIG. 3 shows pilots in an OFDM frame.
Figure 4:
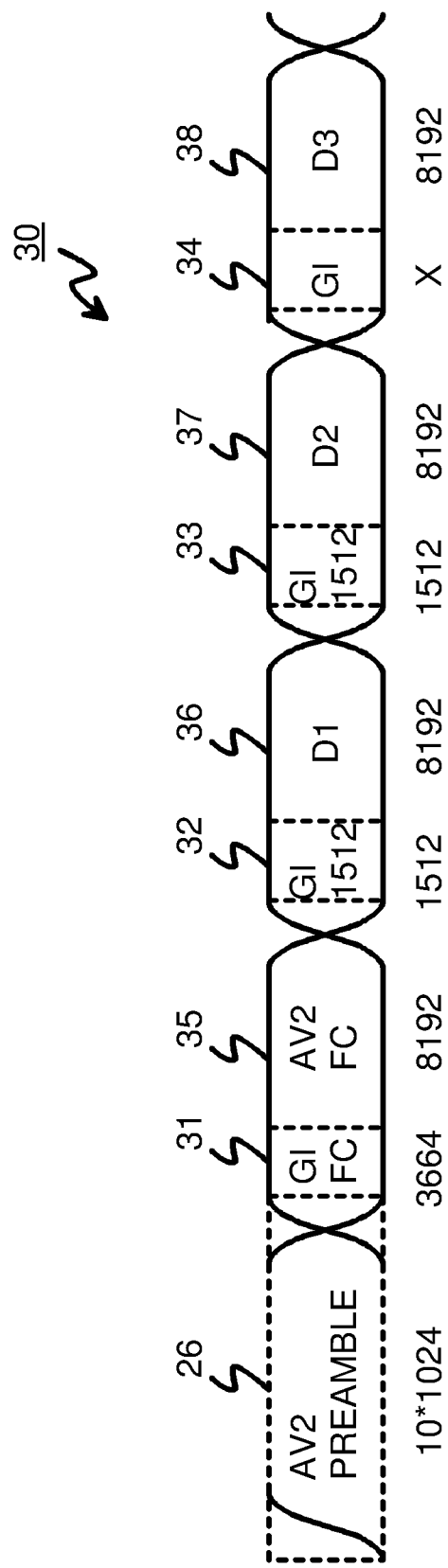
FIG. 4 shows a typical OFDM structure for the HomePlug AV2 standard.
Figure 5:
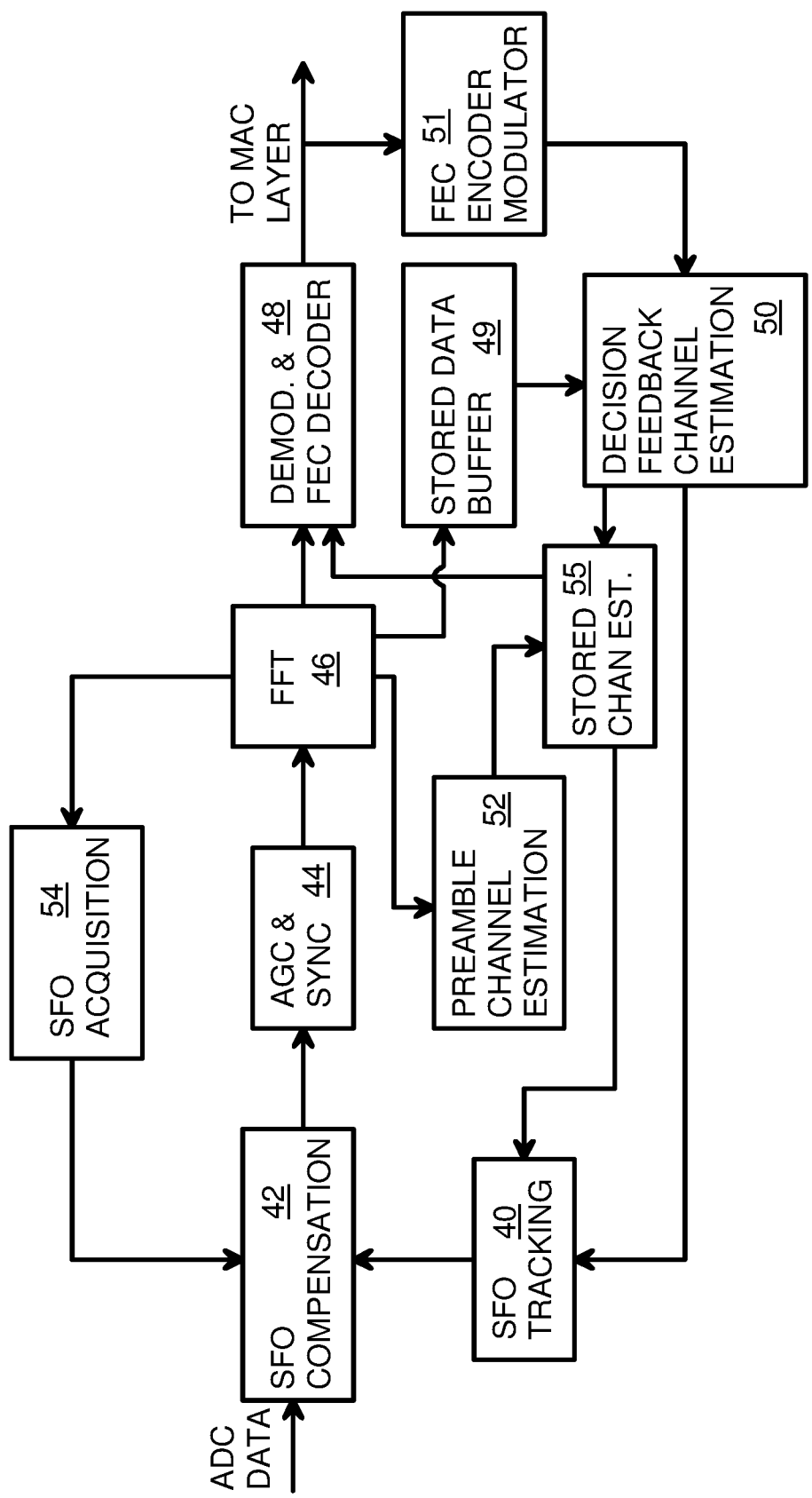
FIG. 5 is a block diagram of an Orthogonal Frequency Division Multiplexing (OFDM) receiver with decision feedback channel estimation and SFO tracking.

FIG. 5 is a block diagram of an Orthogonal Frequency Division Multiplexing (OFDM) receiver with decision feedback channel estimation. The received channel data, such as from an Analog-to-Digital Converter (ADC), is input to Sampling Frequency Offset (SFO) compensator 42. SFO compensator 42 adjusts the receive sampling clock in response to SFO estimates to compensate for frequency offsets.

Automatic Gain Control (AGC) and synchronizer 44 receives the clocked data stream from SFO compensator 42 and performs gain control and synchronization based on the preamble. This synchronization finds the start of the frame. Subsequent symbols can be found by counting samples from the frame start.

Fast Fourier transformer 46 performs a Fast Fourier Transform (FFT) to convert the received datastream from the time domain to the frequency domain. SFO acquisition 54 provides a coarse estimate of the SFO based on the Network Time Base (NTB) from the MAC layer, or from the physical layer using adjacent synchronization symbols in the frequency-domain. The preamble may contain several identical symbols that can be used for synchronization and coarse SFO estimation. These coarse SFO estimates are averaged and then applied to SFO compensator 42 once for each frame, at the end of the preamble.

Demodulator 48 demodulates the data stream from Fast Fourier transformer 46. Forward Error Correction (FEC) is also performed on the demodulated data stream by demodulator 48. The demodulated, error-corrected data can then be output to the Media-Access-Controller (MAC) layer in the receiver for further processing.

Preamble channel estimator 52 compares the received preamble symbol to a reference symbol. The reference symbol can be defined by the communication standard and is thus pre-determined. This comparison is performed on frequency-domain symbols. The difference between the received preamble symbol and the reference preamble symbol is used to generate a preamble-based channel estimate that is applied to SFO tracker 40. Since the preamble symbol only is received once, at the beginning of a frame, this preamble-based channel estimate is generated and stored as stored channel estimate 55 for input to SFO tracker 40 only once, at the beginning of the frame. The channel estimate stored by stored channel estimate 55 is a vector that is an estimation of the channel response, while the SFO error estimate generated by SFO tracker 40 is a single value representing the clock difference between the transmitter and receiver.

Data payload symbols are stored in stored data buffer 49 before they are processed by demodulator 48. The frequency-domain symbols generated by Fast Fourier transformer 46 are stored by stored data buffer 49. Decision feedback channel estimator 50 can read these prior symbols when generating the decision feedback channel estimate. Storing a few symbols in stored data buffer 49 allows for pipeline delays.

When no FEC errors are detected for a symbol, the demodulated, error-corrected symbol generated by demodulator 48 is re-encoded for FEC by FEC encoder 51 and modulated using the same modulation scheme used by demodulator 48. This should produce exactly the same symbol that was stored earlier in stored data buffer 49, but without transmission errors such as attenuation, channel noise, and other inference of the physical media between the transmitter and the receiver.

Decision feedback channel estimator 50 compares the FEC re-encoded and re-modulated symbol from FEC encoder 51 to the pre-demodulated, pre-FEC-decoded symbol that was earlier stored in stored data buffer 49 from Fast Fourier transformer 46 before demodulation and FEC decoding. The comparison by decision feedback channel estimator 50 produces a feedback channel estimate of the channel response.

This feedback channel estimate generated by decision feedback channel estimator 50 is then used to adjust an earlier channel estimate, either preamble-based channel estimate from preamble channel estimator 52, or a subsequent channel estimate from decision feedback channel estimator 50 when processing other symbols after the preamble. The newly generated channel estimate from decision feedback channel estimator 50 is then stored in stored as channel estimate 55.

The newly generated channel estimate from decision feedback channel estimator 50 is applied to SFO tracker 40, which adjusts the SFO compensation performed by SFO compensator 42.

An initial channel estimate is provided by preamble channel estimator 52 using the preamble symbols, then as each new symbol is received and processed, a new channel estimate is generated by decision feedback channel estimator 50. SFO tracker 40 adjusts the SFO compensation value as each symbol is processed and new channel estimates are made by decision feedback channel estimator 50, allowing SFO compensator 42 to compensate for the tracked changes (errors) in the Sampling Frequency Offset. Compensation starts with the preamble and continues as data payload symbols are processed for tracking residual sampling frequency offsets.

Figure 6A:
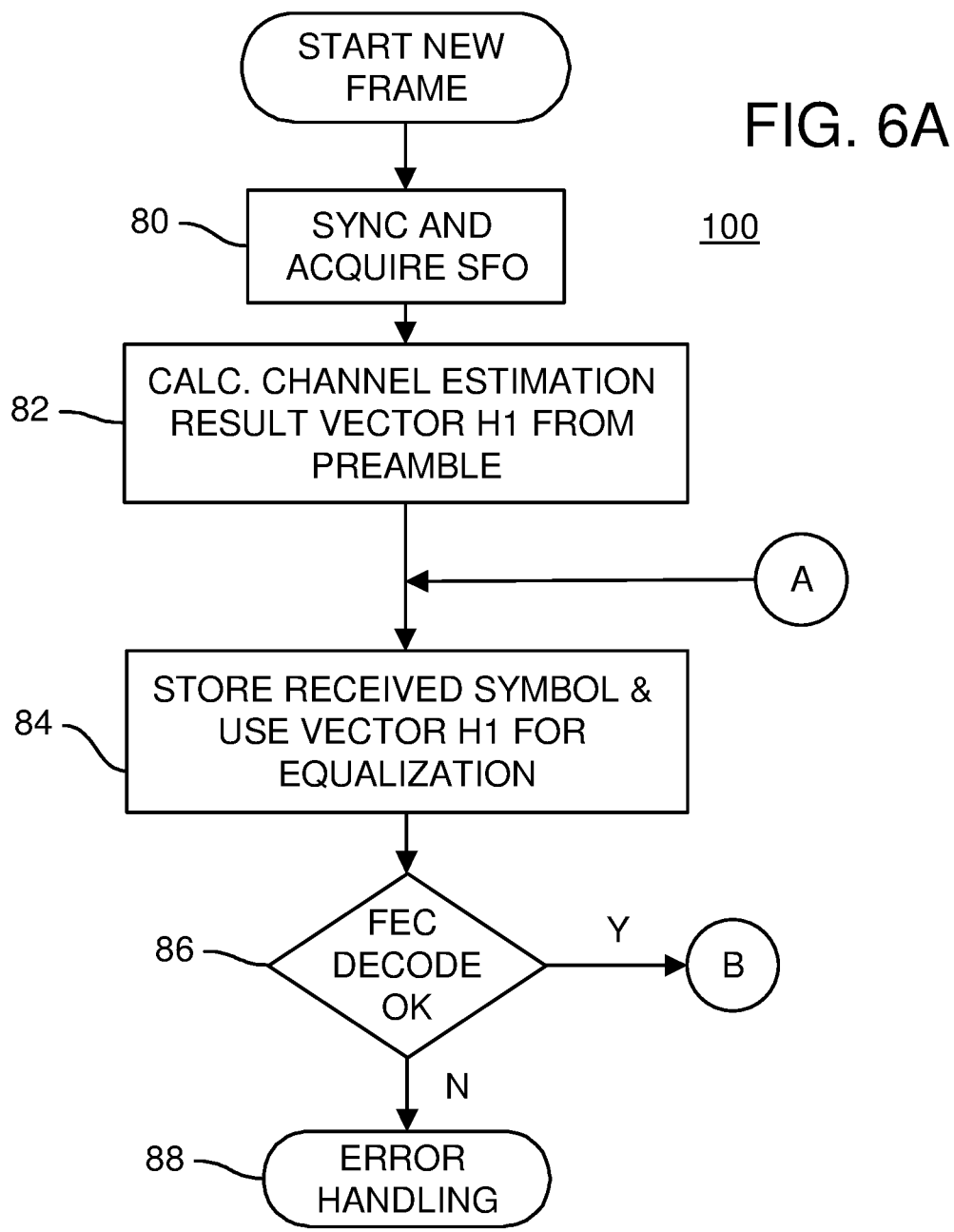
FIGS. 6A-6B show a flowchart of preamble and decision feedback channel estimation for SFO tracking in a frame.
Figure 6B:
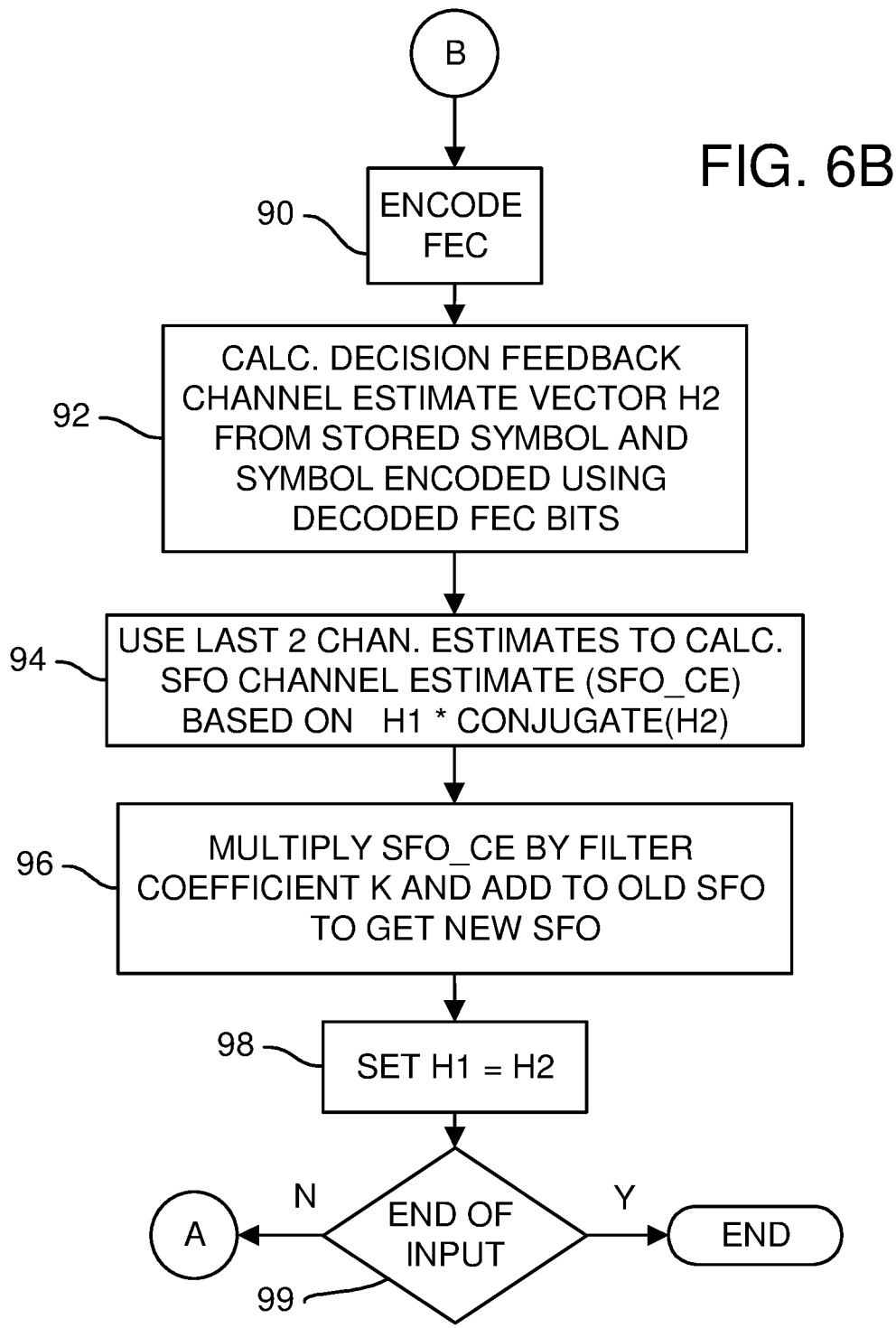

FIGS. 6A-6B show a flowchart of preamble and decision feedback channel estimation based on SFO tracking of a frame. SFO tracking and channel estimation routine 100 can be executed for each frame received.

In FIG. 6A, when a new frame is detected, synchronizer 44 (FIG. 5) uses the frame preamble to synchronize to the data stream, step 80. SFO acquisition 54 acquires the initial coarse estimate of SFO, which is used for the preamble and first symbols.

After the preamble has been received, preamble channel estimator 52 generates the preamble-based channel estimate, vector H1, by comparing the received preamble symbol vector Frx to the reference preamble symbol vector Fref, step 82. These are frequency-domain vectors and the comparison is obtained by vector division:

$$\vec{H}_1 = \vec{F}_{rx} / \vec{F}_{ref}$$

or H1=Frx/Fref, where H1, Frx, and Fref are vectors.

In step 84, the next symbol is received using the H1 channel estimate for channel equalization. This next symbol is stored in stored data buffer 49. FEC is decoded for this symbol after demodulation by demodulator 48, and error handling routine 88 is called when an uncorrectable error is detected. The symbol is skipped if an uncorrectable error is detected. When no error is detected, step 86, in FIG. 6B the symbol is re-encoded using FEC, step 90.

Decision feedback channel estimator 50 compares the re-encoded symbol, vector Ftx, with the stored symbol, Frx, step 92. The stored symbol Frx was earlier stored as stored in stored data buffer 49 from Fast Fourier transformer 46.

The comparison is performed by dividing the frequency-domain vectors:

$$H2 = Frx/Ftx$$

wherein H2 is the vector of the decision feedback channel estimate.

This newly generated decision feedback channel estimate H2 and the prior channel estimate H1 are combined by multiplying the complex conjugate of H2 with H1:

$$H1 * \text{Conj}(H2)$$

The new channel estimate SFOE_CE is a value extracted from the vector result of H1*Conj(H2), step 94.

The new channel estimate SFOE_CE is then multiplied by a filter coefficient k and added to the prior channel estimate SFO(old) to generate the newly updated channel estimate SFO(new):

$$\text{SFO(new)} = \text{SFO(old)} + k * \text{SFOE\_CE}$$

wherein k is between 0 and 1. Filter coefficient k can be programmable and may be determined by experimentation. Updating of SFO, step 96, can be performed by SFO tracker 40 or by SFO compensator 42.

The prior channel estimate H1 is over-written with the new channel estimate H2, step 98. When the next symbol is processed, a new value of H2 will be generated, step 92, after the symbol is received using the prior channel estimate H1, step 84. Stored data buffer 49 only needs to store one prior channel estimate. New symbols are received and new channel estimates H2 generated for subsequent symbols in the frame until all symbols have been processed, step 99.

Figure 7:
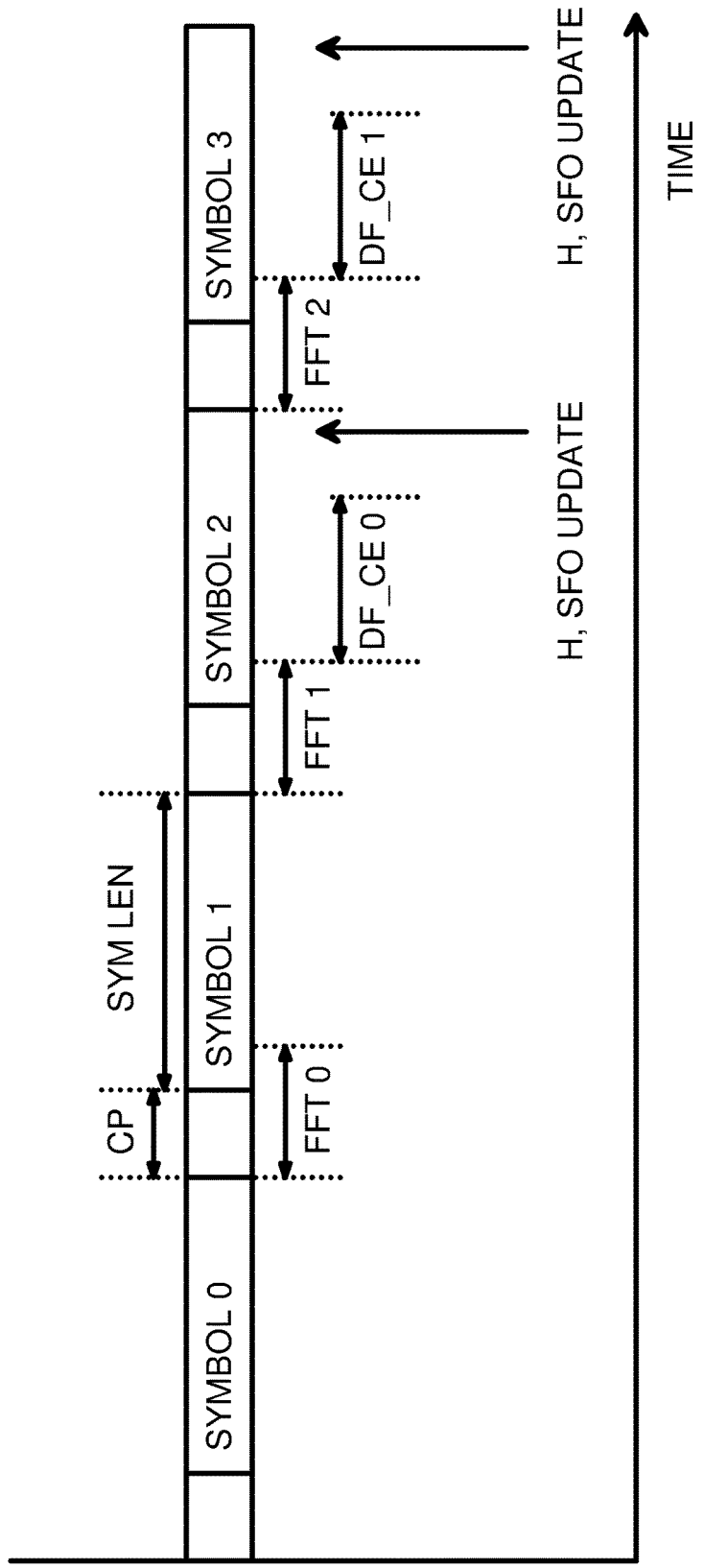
FIG. 7 is a timing diagram of processing an OFDM frame using SFO tracking based on decision feedback channel estimation.

FIG. 7 is a timing diagram of processing an OFDM frame using decision feedback channel estimation.

Each symbol is preceded by a cyclic prefix (CP). The cyclic prefix provides a guard interval, allowing echoes to occur before interfering with the subsequent symbol. The cyclic prefix repeats the end of the current symbol so that the linear convolution from the symbol can be modeled as a circular convolution, simplifying frequency-domain processing. The cyclic prefix turns the linear convolution with the channel into a circular convolution and simplifies OFDM equalization.

Once a symbol has been received, its Fast Fourier Transform (FFT) is generated. However, some of the FEC units may be spread over the following symbols, so FEC decoding and checking waits until the following symbol is received. After this next symbol is converted to the frequency domain by FFT, all FEC codes should be available. The gap between DF_CE and FFT allows time for demodulation and FEC decoding to occur. Then the prior symbol's symbol can be re-encoded with FEC and compared by decision feedback channel estimator 50 to generate the decision feedback channel estimate, DF_CE0. SFOE to SFO compensator 42 can then be updated.

Symbol 0 has its FFT_0 generated immediately after the end of symbol 0, but must wait for FEC codes from next symbol 1 when its FFT_1 is generated before decision feedback channel estimator 50 can generate the new estimate DF_CE0 and update SFOE in SFO tracker 40. Thus there is a delay of almost two symbols before the SFOE can be updated.

However, tracking SFO and updating SFOE for each symbol allows the received frame length to increase significantly. Frame lengths can increase by 10× using decision feedback channel estimation. Pilots are not needed since the actual symbols are used to estimate offset.

Figure 8:
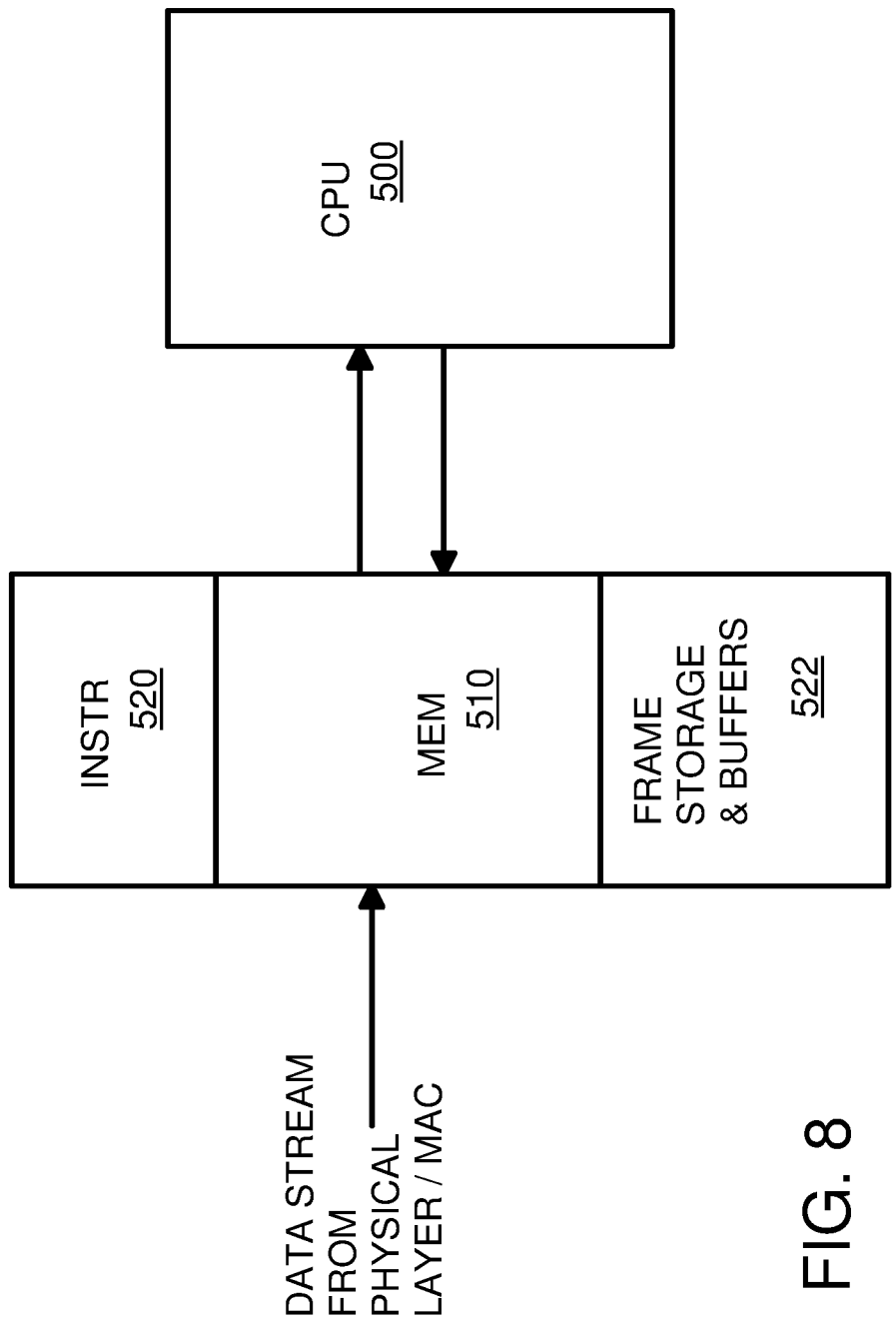
FIG. 8 is a block diagram of a digital-signal processor (DSP) that performs decision feedback channel estimation and other processes described herein.

FIG. 8 is a block diagram of a digital-signal processor (DSP) that performs decision feedback channel estimation and other processes described herein. Central Processing Unit (CPU) 500 is a microprocessor that has a digital-signal processor (DSP) or other enhancements such as a pipeline to process received data. CPU 500 executes instructions 520 stored in memory to perform the operations of the process flowcharts FIGS. 6A-6B.

The data stream from the physical layer such as from an Analog-to-Digital Converter (ADC) are input to memory 510 for processing by CPU 500, which may use lookup tables or a specialized processor or data pipeline to receive and synchronize symbols, detect and process frame preambles, and generate SFO estimates. Data can be written to frame storage buffers 522 in the memory. Stored data buffer 49 may be part of frame storage buffers 522.

Alternate Embodiments

Several other embodiments are contemplated by the inventors. For example other arrangements and combinations of the blocks shown in FIG. 5 and the flow steps in FIG. 6 could be used. Additional steps and functions could be added. Deeper or shallower pipelines could be substituted. Various initialization and start-up procedures could be added. The timing of processing the symbols and other parts of the frame in FIG. 7 may vary. Symbol sizes could be adjusted and standards could change. The number of symbols in a frame may be varied, as can the size and use of cyclic prefixes and guard intervals. Various data transmission rates and bandwidths may be provided for. When one OFDM symbol contains an integer number of FEC units, there is no need to wait for next symbol to be received.

Logic may be shared among several units. For example, SFO acquisition 54 may use the same calculation logic as SFO tracker 40. Vector data may be stored in stored data buffer 49 for preamble channel estimator 52, 50, and SFO tracker 40, or separate memory buffers may be used. Stored channel estimate 55 may use a separate data buffer, or may be stored in the same physical memory buffer as stored data buffer 49, or in a larger physical memory. FIG. 8 is one type of implementation method, but the invention is not restricted to being implemented on DSP platforms. The invention may also be implemented with an Application-Specific Integrated Circuit (ASIC) design, or other implementations.

Error correction could be performed on some symbols to produce corrected symbols. Decision feedback channel estimator 50 may skip these symbols that had uncorrectable errors, only estimating SFO for symbols that had no errors. Various kinds of error detection and/or correction could be substituted.

While a filter coefficient k has been described to filter adjustments to SFOE, other kinds of filtering could be used. Various digital processing routines could be used to perform filtering and other signal processing tasks.

While an Orthogonal Frequency Division Multiplexing (OFDM) receiver has been described, the invention may be applied to other kinds of receivers wherein the incoming data was transmitted over a physical layer using a plurality of parallel narrow-band subcarriers. Many variations, extensions, and expansions of OFDM may be substituted.

While Fast Fourier transformer 46 performing a Fast Fourier transform has been described, a Discrete Fourier Transform (DFT) could be substituted, or a Discrete Cosine Transform (DCT) could be substituted. More generically, Fast Fourier transformer 46 can be a time-to-frequency-domain transformer that can use any of FFT, DFT, DCT, or similar transforms to convert to the frequency domain.

Additional components may be added at various nodes for various purposes, such as cut-off switches for power-down modes, voltage shifters, offset currents to set A.C. operating points, etc.

Various combinations of hardware, programmable processors, software, and firmware may be used to implement functions and blocks. Pipelining may be used, as may parallel processing. Various routines and methods may be used, and factors such as frame, symbol, and prefix size and format may also vary.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A receiver comprising:
   a Sampling Frequency Offset (SFO) compensator that adjusts a sampling clock in response to a SFO estimate;
   a time-to-frequency-domain transformer that generates frequency-domain symbols by performing a time-to-frequency-domain transform on incoming data sampled by the sampling clock;
   wherein the incoming data was transmitted over a physical layer using a plurality of parallel narrow-band subcarriers;
   a demodulator that demodulates the frequency-domain symbols to generate demodulated data;
   an error decoder that reads error-correction words from the demodulated data and generates error-corrected data;
   an error re-encoder that receives an error-corrected data generated by the error decoder, and performs error encoding on the error-corrected data to generate a re-encoded data;
   a re-modulator that modulates the re-encoded data to generate re-encoded symbols;
   a decision feedback channel estimator that compares one of the re-encoded symbols to a stored symbol to generate a decision feedback channel estimate; and
   a SFO tracker that receives the decision feedback channel estimate from the decision feedback channel estimator and adjusts the SFO estimate to the SFO compensator in response to the decision feedback channel estimate,
   wherein the decision feedback channel estimate is used by the SFO tracker to adjust SFO compensation as symbols are successively processed.

2. The receiver of claim 1 further comprising:
   a preamble channel estimator that compares a preamble symbol in the frequency-domain symbols generated by the Fast Fourier Transformer to a reference preamble symbol in a frequency domain to generate a preamble channel estimate;
   wherein the SFO tracker also receives the preamble channel estimate from the preamble channel estimator and generates a SFO estimate to the SFO compensator in response to the preamble channel estimate,
   whereby the preamble symbol also causes coarse adjustment of the SFO estimate.

3. The receiver of claim 2 wherein symbols are arranged into a frame having the preamble symbol followed by cyclic prefixes before each of the symbols, wherein the frame contains no pilots in data payload slots for synchronizing the data,
   wherein the frame is a Orthogonal Frequency Division Multiplexing (OFDM) frame and the receiver is an OFDM receiver;
   wherein the time-to-frequency-domain transformer performs a Discrete Cosine Transform (DCT), a Fast Fourier Transform (FFT), or a Discrete Fourier Transform (DFT), to generate the frequency-domain symbols.

4. The receiver of claim 3 further comprising:
a stored data buffer that stores the frequency-domain symbols before processing by the demodulator and by the error decoder and reads the frequency-domain symbols to provide the stored symbol to the decision feedback channel estimator.

5. The receiver of claim 4 wherein the frequency-domain symbols are un-demodulated symbols that are stored by the stored data buffer.

6. The receiver of claim 4 wherein the preamble channel estimator generates an H1 vector for the preamble channel estimate by dividing a vector of the preamble symbol in the frequency-domain symbols generated by the Fast Fourier Transformer by a vector of the reference preamble symbol in a frequency domain,
wherein comparison is performed by vector division.

7. The receiver of claim 6 wherein the decision feedback channel estimator generates an H2 vector by dividing a vector of the stored symbol by a vector of the re-encoded symbol;
wherein a conjugate of the H2 vector is multiplied by the H1 vector to generate a decision feedback SFO estimate;
wherein the H2 vector over-writes the H1 vector in a stored channel estimate buffer for use by a next symbol processed.

8. The receiver of claim 7 further comprising:
filter means, in the SFO tracker, for multiplying the decision feedback SFO estimate by a filter constant and adding to a prior SFO estimate to generate the SFO estimate to the SFO compensator,
whereby SFO estimate adjustments are filtered.

9. The receiver of claim 1 wherein the error-corrected symbol is sent to a Media-Access-Controller (MAC) layer for further processing by a MAC receiver.

10. The receiver of claim 1 wherein the error re-encoder and the error decoder use a same error code format, wherein when no errors occur, the re-encoded symbol and the frequency-domain symbol match for a same input symbol.

11. The receiver of claim 1 further comprising:
a symbol skipper, coupled to the error decoder, for skipping SFO adjustment by a symbol that has an error signaled by the error decoder,
wherein symbols with detected errors are not used to adjust the SFO estimate.

12. The receiver of claim 1 wherein the sampling clock is for sampling digital data from a Analog-to-Digital Converter (ADC) in a physical layer.

13. The receiver of claim 4 further comprising:
a SFO acquisition module that generates a coarse SFO estimate to initially adjust the sampling clock;
wherein the SFO acquisition module uses a Network Time Base (NTB) from a Media-Access-Controller (MAC) layer, or uses other frequency-domain symbols received earlier from the physical layer to generate the coarse SFO estimate.

14. The receiver of claim 4 further comprising:
a synchronizer that detects a frame start on incoming data from the SFO compensator to generate the incoming data sampled by the sampling clock that is applied to the Fast Fourier Transformer.

15. A Orthogonal Frequency Division Multiplexing (OFDM) receiver comprising:
a data input for receiving incoming data converted from analog signals that carry data on multiple narrow-band subcarriers, the incoming data being arranged into frames of symbols;
an offset compensator that receives a Sampling Frequency Offset (SFO) estimate, the offset compensator adjusting a sampling clock in response to the SFO estimate, the sampling clock sampling the incoming data;
a time-to-frequency-domain transformer for using a Fourier Transform (FT) or a discrete cosine transform (DCT) to convert symbols of the incoming data into frequency-domain symbols;
a stored data buffer for storing the frequency-domain symbols;
a demodulator for demodulating the frequency-domain symbols to generate demodulated data;
an error-code decoder for decoding error codes in the demodulated data to generate error-corrected data;
an error re-encoder that receives the error-corrected data and adds redundancy to generate re-encoded data
a re-modulator that modulates the re-encoded data to generate re-encoded symbols;
a decision feedback channel estimator that compares the re-encoded symbols to the frequency-domain symbols stored in the stored data buffer to generate a decision feedback channel estimate;
a preamble channel estimator that compares a frequency-domain symbol for a preamble to a reference preamble symbol to generate a preamble channel estimate;
a SFO tracker that uses the preamble channel estimate and the decision feedback channel estimate to adjust the SFO estimate,
whereby SFO estimates are adjusted for symbols in a frame.

16. The OFDM receiver of claim 15 wherein the preamble channel estimator generates an H1 vector for the preamble channel estimate by dividing a vector of the preamble symbol in the frequency-domain symbols generated by the Fast Fourier Transformer by a vector of the reference preamble symbol in a frequency domain,
wherein comparison is performed by vector division.

17. The OFDM receiver of claim 16 wherein the decision feedback channel estimator generates an H2 vector by dividing a vector of the frequency-domain symbol stored in the stored data buffer by a vector of the re-encoded symbol;
wherein a conjugate of the H2 vector is multiplied by the H1 vector to generate the SFO estimate;
wherein the H2 vector over-writes the H1 vector in the stored data buffer for use by a next symbol processed.

18. The OFDM receiver of claim 17 further comprising:
a filtering adder, in the SFO tracker, for multiplying the SFO estimate by a filter constant and adding to a prior SFO estimate to generate the SFO estimate applied to the offset compensator.

19. An orthogonal receiver comprising:
Sampling Frequency Offset (SFO) compensator means for adjusting a sampling clock in response to a SFO estimate;
time-to-frequency-domain transform means for generating frequency-domain symbols by performing a Fast Fourier Transform (FFT) or a discrete cosine transform (DCT) on incoming data sampled by the sampling clock;
wherein the incoming data was transmitted over a physical layer using a plurality of parallel narrow-band subcarriers;

preamble channel estimator means for generating an H1 vector as a preamble channel estimate by dividing a vector of a preamble symbol in the frequency-domain symbols generated by the Fast Fourier Transform means by a vector of a reference preamble symbol in a frequency domain;

a stored data buffer that stores the frequency-domain symbols and reads the frequency-domain symbols to provide a stored symbol;

demodulator means for demodulating the frequency-domain symbols to generate demodulated data;

error decoder means for reading error-correction words from demodulated data and for generating error-corrected data;

error re-encoder means, receiving error-corrected data generated by the error decoder means, for error encoding the error-corrected data to generate a re-encoded data;

re-modulator means for modulating the re-encoded data to generate re-encoded symbols;

decision feedback channel estimator means for generating an H2 vector by dividing a vector of the stored symbol by a vector of the re-encoded symbol; and SFO tracker means, receiving the H2 vector from the decision feedback channel estimator means, for multiplying a conjugate of the H2 vector by the H1 vector to generate a decision feedback SFO estimate and for adjusting the SFO estimate to the SFO compensator means in response to the decision feedback SFO estimate;

wherein the H2 vector over-writes the H1 vector in a stored channel estimate data buffer for use by a next symbol processed, wherein SFO compensation is adjusted as symbols are successively processed.

20. The orthogonal receiver of claim 19 further comprising:

filter means, in the SFO tracker means, for multiplying the decision feedback SFO estimate by a filter constant and adding to a prior SFO estimate to generate the SFO estimate to the SFO compensator means, whereby SFO estimate adjustments are filtered.

* * * * *